Jan. 7, 1969 K. W. KLEIN 3,421,128
SERIES-CONNECTED ELECTRICAL CIRCUIT BREAKER ASSEMBLY
Filed May 17, 1966

INVENTOR.
KEITH W. KLEIN
BY Robert F. Casey
ATTORNEY

«3,421,128
SERIES-CONNECTED ELECTRICAL CIRCUIT
BREAKER ASSEMBLY
Keith W. Klein, Simsbury, Conn., assignor to General
Electric Company, a corporation of New York
Filed May 17, 1966, Ser. No. 550,800
U.S. Cl 337—35                                                7 Claims
Int. Cl. H01h 61/00; H01h 9/26

ABSTRACT OF THE DISCLOSURE

An electric circuit breaker assembly comprising a pair of separately enclosed circuit breakers mounted side-by-side, with handles ganged together for simultaneous operation; the assembly includes an incoming terminal at one end, means connecting the contacts of the two circuit breakers in series, and an outgoing terminal at the other end, whereby a unitary circuit breaker is provided having an interrupting capacity substantially higher than either of the individual circuit breakers.

---

The present invention relates to electric circuit breaker assemblies of the type automatically operable in response to an overload current and, more particularly, to a novel series-connected circuit breaker assembly.

Electric circuit breakers of the type which may be manually operated to move a single pair of stationary and movable contacts between open and closed positions by means of a toggle-type mechanism and which are automatically tripped in response to an overload condition in the circuit controlled by the breaker are widely used both alone and in combinations in panelboards for control of electric light and power circuits in residential, commercial and industrial applications. A compact breaker of this general type is described in detail in Patent No. 2,627,563, issued Feb. 3, 1953, to W. A. Thomas, and assigned to the same assignee as this invention. In the type of breaker therein illustrated, a tripping member is releasably restrained by an overload-actuated latching member and is biased by the spring of the toggle-type mechanism to move to a position permitting circuit opening operation of the breaker by the toggle-type mechanism independently of the position of the manual operating member.

In certain situations, it is advantageous to use two or more of the above type circuit breakers in panelboards and similar devices where the circuit breakers are positioned in side-by-side relationship to control a plurality of circuits. In multipole breakers of this type, it is generally desirable to insure tripping of all poles in response to automatic tripping of any one of the poles by a coupling or interlocking means as described in detail in Patent No. 2,779,831, issued Jan. 29, 1957, to W. A. Thomas and assigned to the same assignee as the present invention.

It is an object of the present invention to provide a novel, compact electrical circuit breaker assembly having a pair of circuit interrupting contacts connected in series and adapted for substantially simultaneous operation to interrupt a circuit carrying a substantially higher voltage than could be interrupted by only a single pair of such contacts.

It is also an object to provide such a circuit breaker assembly which is adaptable to existing compact relatively low rated circuit breakers and which is suitable for use in existing plug-in type panelboards and similar devices.

Another object is to provide such a circuit breaker assembly by relatively simple and economical modification of conventional single-pole circuit breaker construction.

Other objects and advantages will be readily apparent from the following detailed specification, the accompanying drawings and the appended claims.

It has now been found that the foregoing objects and other advantages can be readily attained in a circuit breaker assembly including an enclosing casing of insulating material having a plurality of pairs of cooperating stationary and movable contacts supported therein. A plurality of operating mechanisms is supported by the casing and positions the movable contacts relative to the stationary contacts in open and closed circuit positions. The operating mechanisms each comprise a releasable member normally biased to contact opening position and latch means normally restraining the releasable member and operable to release the releasable member. In addition, the operating mechanism also includes an operating member for positioning the movable contact in open and closed circuit positions. Interconnecting means are provided between the plurality of operating mechanisms which is actuated upon release of any one of the releasable members to cause substantially simultaneous release of the releasable members of the plurality of operating mechanisms to position substantially simultaneously all of the movable contacts in the open circuit position. The circuit breaker assembly also includes electrical conducting means connecting the plurality of pairs of cooperating stationary and movable contacts in series, and current responsive means responsive to the circuit flowing through the circuit breaker assembly and operatively connected to one of the operating mechanisms for releasing the releasable member upon the occurrence of predetermined current conditions in the current flowing through the circuit breaker assembly.

In this manner, the plurality of pairs of contacts are substantially simultaneously opened and closed so as to enable such a series connected plurality of pairs of contacts to carry a higher line voltage than would normally be accommodated by a single pair of similar contacts with the arcing produced thereat.

In the preferred embodiment of this invention, two or more single-pole circuit breakers of generally conventional construction are connected in series by means of an interconnecting conductor extending longitudinally between the casings. The line terminal of one of the circuit breakers may be removed and one end portion of the conductor extends through an aperture in the casing thereof to provide the stationary contact in place of the one removed although a circuit breaker may be made without the line terminal for use with this invention. The other end of the conductor passes through an aperture in the other casing and is suitably attached to the load terminal thereof and the usual fastener for engagement with a load connector is removed. Thus, by simply removing the line terminal and stationary contact of one conventional circuit breaker, two conventional single-pole breakers may be connected in series by a relatively inexpensive conductor positioned therebetween.

A relatively inexpensive coupling or connecting member is disposed on the portions of the manual operating members of the two circuit breakers extending outwardly of the casings so that the two pairs of contacts of the circuit breakers will be operated substantially simultaneously to the open and closed position. The interconnecting means between the releasable members of the circuit breaker may be provided by such a construction as described and claimed in the above mentioned Thomas Patent No. 2,779,831 which insures that the two circuit breakers will be tripped to the open circuit position substantially simultaneously. In this construction, an interlocking member is disposed in the space between the adjacent walls of the casings and is rotatably supported. A portion thereon extends into each of the casings which is engageable by the releasable members when released by the latch means to effect rotation thereof and another portion thereof is engageable with the latch means of the breakers so that movement of the releasable member of one breaker effects operation of the latch member of the other breaker.

Thus a conventional circuit breaker construction is readily modified for use on higher voltage circuits and may be used on existing panelboards without further modification or expense. Preferably, however, one of the circuit breakers is of initially modified construction so as to eliminate the current-responsive means therefrom. In this manner, it is possible to effect economy and to minimize the need for calibration of several current-responsive means when one is sufficient to effect tripping by reason of the interconnecting means between the operating mechanisms to effect simultaneous tripping.

The invention will be more fully understood from the following detailed specification and its scope will be pointed out in the appended claims.

Figure 1:
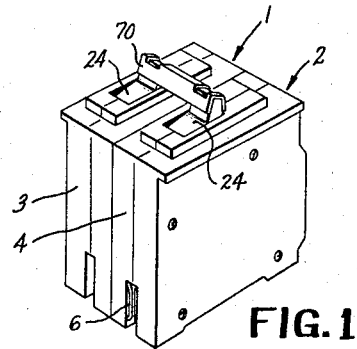
FIGURE 1 is a perspective view of a circuit breaker assembly embodying this invention.

Referring now in detail to the attached drawing, the invention is embodied in a two-pole breaker assembly made up of two substantially identical single-pole circuit breakers generally designated by the numerals 1 and 2 secured in side-by-side relation by suitable bolts (not shown) extending through the insulating casings 3 and 4 thereof. The individual breakers illustrated in connection are the type shown and described in detail in the above mentioned Thomas Patent No. 2,627,563 and may be of identical construction substantially except for the modifications in the casings for accommodating the parts of the interlocking mechanism and in the latching member for the purpose of cooperation with the interlocking mechanism which are described in the above mentioned Thomas Patent No. 2,779,831. Since the breakers 1 and 2 are of substantially the same construction, the description, to the extent that it applies to both breakers, will not be duplicated and the same reference numerals will be applied to corresponding parts.

Figure 2:
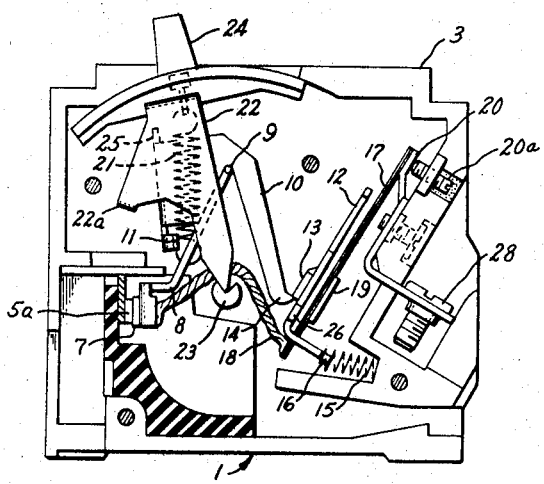
FIGURE 2 is a side elevational view to an enlarged scale of one of the circuit breakers of the circuit breaker assembly of FIGURE 1, with one side of the casing removed and portions broken away for clarity of illustration.

The operating mechanism of the individual breakers 1 and 2 is best illustrated in FIGURE 2. As there illustrated, the parts are received and positioned in suitable recesses formed in the insulating casing 3 and include the modified stationary contact 5a (in breaker 1, the contact 5 is a part of the line terminal 6 in accordance with conventional breaker construction) and a movable contact 7 supported by the contact arm 8 which is pivoted at pivot point 9 on a releasable cradle or tripping member 10. The cradle 10 is pivoted in the casing at pivot point 11 and retained in the latched position illustrated in FIGURE 2 by a pivoted armature and latch 12 having a latching portion 13 engaging the shoulder 14 of the cradle 10 and biased toward the position illustrated in FIGURE 2 by a compression spring 15 positioned between the casing 3 and a lug 16 thereon.

The latch 12 is adapted to be moved in a counterclockwise direction to release the cradle 10 in response to a relatively small continuous overload condition in the current passing through the contacts 5a and 7 by a bimetallic strip 17 connected at the free end thereof to the contact 7 by the flexible conductor 18. The bimetallic strip 17 has a magnetic field piece 19 attached thereto which is energized as a magnet by the current passing therethrough. When a relatively sudden, large increase in current passes through the strip 17, the magnetic field generated by the magnetic field piece 19 is sufficient to magnetically engage the armature and latch 12 to release the cradle 10. The bimetallic element 17 abuts against a shoulder (not shown) on the latch member 12 to effect pivoting thereof and is supported at the opposite end on one end of a conducting load terminal strap and support member 20 to which it is welded or otherwise secured. The position of the bimetallic strip 17 may be adjusted by the adjusting screw 20A. The terminal strap 20 has a screw 28 attached to the other end thereof for connecting a load conductor (not shown).

A manually operable handle 24 is attached to the operating member 22 and extends outwardly from the casing 3. The cradle 10 is biased to move in a counterclockwise direction as seen in FIGURE 2 to move the contact arm 8 and open the contacts 5a, 7 by the snap-acting toggle mechanism of the breaker which includes an overcenter spring 21 connected at one end thereof to the movable contact arm 8 and at the other end thereof to the handle 24 of the operating member 22. Since the operating member 22 is pivoted on the casing 3 at the lug 23, it may be seen from the drawing that, as the operating handle 24 is moved to the right as seen in FIGURE 2, it carries with it the upper end of the overcenter spring 21 until the line of action crosses the pivot point 9 for the contact arm 8 and then the movable contact arm 8 moves to the right with a snap action.

With the circuit breaker parts in the position shown in FIGURE 2, the movable contact 7 and contact arm 8 may move to an open position in response to release of the cradle 10 upon the occurrence of a continuous small overload in the circuit passing through the contacts 5a, 7. Upon the occurrence of such an overload condition, the lower end of the bimetallic strip 17 bends to the right carrying with it the latch member 12 to release the cradle 10. Similarly, a sudden large overload current will produce a magnetic field in the magnetic field piece 19 of sufficient strength to pull the latch 12 and release the cradle 10. In either automatic operation, the cradle 10 rotates about the pivot 11 under the bias of the operating spring 21 until the pivot point 9 passes through the line of action of the spring 21 on the movable contact arm 8 at which time the contact 7 moves to the open position with a snap action. As described in the aforementioned Thomas Patent No. 2,627,563, and as will be readily understood, the breaker mechanism is reset after the above-described tripping action by rotating the cradle member 10 in a clockwise direction until the shoulder 14 of the cradle 10 engages the latching portion 13. This movement of the cradle 10 is accomplished by manually moving the operating handle 24 to the right as seen in FIGURE 2 so that the shoulder portion 22a of the operating member 22 engages the cradle 10 and moves it in a clockwise direction.

Figure 3:
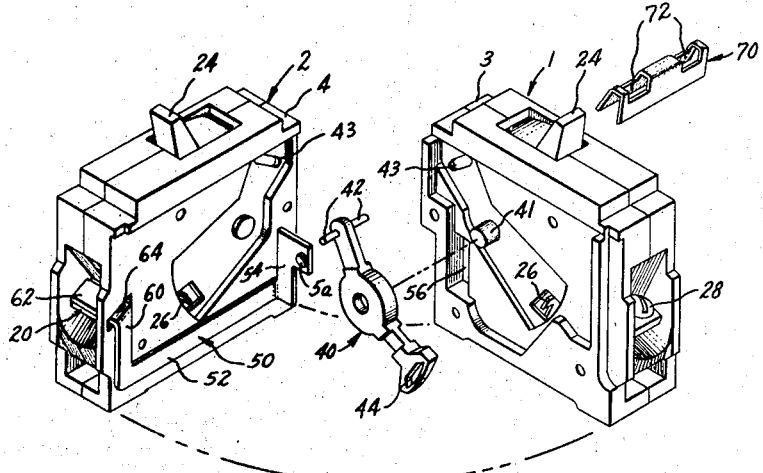
FIGURE 3 is a partially exploded view in perspective, to an enlarged scale, of the opposite end of the circuit breaker assembly of FIGURE 1.

To the extent hereinbefore described, the circuit breakers 1, 2 have been of generally conventional construction. In accordance with the preferred construction of the present invention, the cradles 10 of both breakers have upstanding projections or lug portions 25 on the upper end thereof and the latch members 12 are provided with laterally projecting lug portions 26 adjacent the latching portions 13. As seen in FIGURE 3, an interlocking or cam member 40 is pivotably mounted in a recess or spacing between the casings 3, 4 on a molded hub 41 on the sidewall of the casings. At one end thereof, the cam member 40 is provided with laterally extending arms 42 which extend into openings 43 in the sidewalls of the casings 3, 4 and into the path of movement of the upstanding lug portions 25 on the cradles 10 so as to be moved thereby when either of the breakers is tripped. At the opposite end thereof, the cam member 40 is provided with recesses 44 in the sides thereof which receive the lug portions 26 of the latch members 12 of the two breakers 1, 2. As illustrated, the recesses 44 are shaped to provide cam surfaces which will trip either one of the breakers 1, 2 in response to overload tripping of the other of the breakers.

When the breaker assembly is in closed circuit position, the lug portions 26 on both cradles 12 extend into recesses 44 of the cam member 40. When one of the breakers is tripped and its cradle 10 released, the lug portion 25 thereof engages one of the arms 42 on the cam member 40 which is then moved in a counterclockwise direction so that the cam-surfaced wall of the recess 44 on both sides of the cam member 40 will insure that the lug portion 26 of the latch 12 of the other circuit breaker is moved in the direction to trip or release its cradle 10. In this way, tripping of either of the breakers insures tripping of the other breaker. This operation of the cam member 40 is more fully described in the above mentioned Thomas Patent No. 2,779,831. It is apparent that as many breakers as desired may be connected in side-by-side relation and that the tripping of all the breakers in response to tripping of any one may be insured by interposed cam members 40.

Connecting the internal circuits of the breakers 1, 2 in series is a conductor member generally designated by the numeral 50 which is disposed substantially between the two breakers. The conductor member 50 has an elongated intermediate or body portion 52 extending generally longitudinally between the casings 3, 4 and at one end thereof a leg portion 54 extending laterally and upwardly therefrom into an elongated opening 56 in the casing 3. The leg portion 54 carries the stationary contact 5a of the breaker 1. At its other end, the conductor member 50 has an upwardly extending leg portion 60 which has at its upper end a connecting portion 62 which extends laterally therefrom through the aperture 64 in the casing 4. The connecting portion 62 is brazed or otherwise attached to the lower end of the load terminal 20.

Although both of the circuit breakers 1 and 2 may be provided with current-responsive means in the form of the bimetallic strip 17 and pole piece 19, it is economically advantageous to omit the current-responsive means from one of the breakers, preferably that connected to the line which, in this instance, is breaker 2. To effect this modification, the load terminal 20 may be formed with or secured to a depending relatively flexible conductive strip similar in dimension to the bimetallic strip 17. Thus, economy may be effected and the need to calibrate a plurality of current-responsive means is obviated. However, for maximum security, current-responsive means may be maintained or provided in each circuit breaker and equivalently calibrated.

Figure 4:
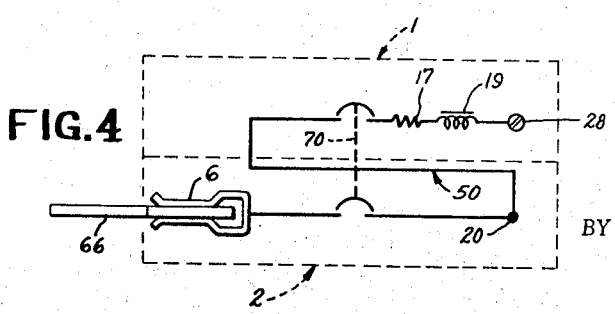
FIGURE 4 is a diagrammatical illustration of the series-connected circuits of the circuit breaker assembly of FIGURE 1 with one of two blades of an associated panelboard engaged with the line terminal of one of the circuit breakers and with the casings shown in phantom line.

In this manner, the circuit breakers 1, 2 are connected in series as diagrammatically illustrated in FIGURE 4. The current path through breakers 1 and 2 is from a blade 66 of an associated control panelboard (not shown) to the line terminal 6 of the breaker 2 through which it flows to the load terminal strap 20, to the stationary contact on the opposite end thereof inside the circuit breaker 1 through which the current then passes to the load terminal 28 of the circuit breaker 1.

In order that the operating mechanism of the circuit breakers 1 and 2 may be manually operated to open and close movable contacts 7 substantially simultaneously, an interconnecting or coupling member generally designated by the numeral 70 is provided to rigidly connect the manually operable handles 24 of the circuit breakers 1 and 2. The coupling member 70 is of generally channel-shaped cross-section to conform substantially to the configuration of the handles 24 and is provided with two apertures 72 in the base portion thereof aligned with the handles 24. The apertures 72 function to provide some resiliency of the member 70 to enable fitting of the coupling member 70 over the handles 24 and any convenient means may be employed to obtain engagement therebetween including functional fitting. By moving the interconnecting member 70, the operating handles 24 are thereby moved simultaneously so that the series-connected circuit is interrupted and closed by the two movable contacts at substantially the same time.

Figure 5:
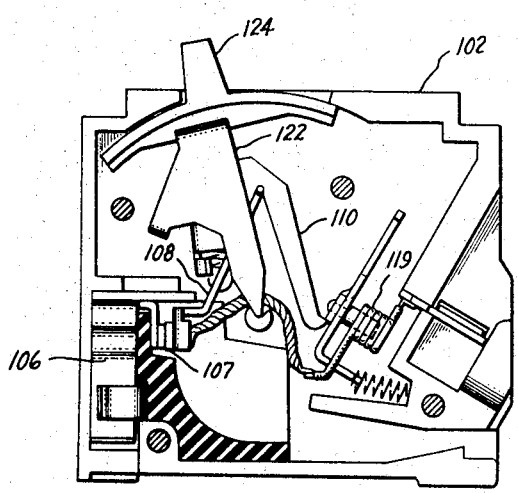
FIGURE 5 is a side elevation view of a portion of another embodiment of the invention.
Figure 6:
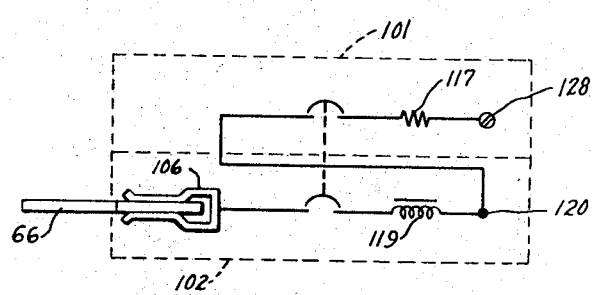
FIGURE 6 is a diagrammatic illustration of the embodiment of the invention a portion of which is illustrated in FIGURE 5.

Referring to FIGURES 5 and 6, the invention is illustrated in another embodiment. This embodiment is generally similar to the embodiment illustrated in FIGURES 1–4, corresponding parts being numbered similarly, but with the prefix "100." Thus this embodiment includes two side-by-side circuit breaker enclosures 101 and 102 each, containing circuit breaker operating mechanism, the mechanism contained in chamber 102 being the only one illustrated, it being understood that a similar mechanism is contained in chamber 101. The operating mechanism includes a releasable latched member 110, and a movable contact arm 108 supporting a movable contact member 107, which is moved between open and closed circuit positions by means of a manually operable handle 124. This embodiment of the invention includes thermal and magnetic tripping means, but the thermal trip means 117 is contained in the casing 101, while the magnetic tripping means 119 is contained in the chamber 102. By utilizing this arrangement, it is possible to provide a larger, and therefore more sensitive magnetic trip device 119 than is possible when both the thermal and magnetic trip means must be included in a single chamber.

In accordance with another aspect of the invention, the conductor member 50 is fabricated from a material of relatively high resistance to reduce the current passing therethrough during a short circuit. If desired, the casings for one or both members of a pair may be modified if so desired and more than two breakers may be similarly connected in series if so desired. The circuit breakers may be connected to the line or current by stabs as illustrated by bolts or other suitable means.

Accordingly, by providing electrical conductors to connect relatively small circuit breakers of generally conventional construction in series and means for opening and closing the pairs of contacts simultaneously, it is possible to provide higher voltages for electric light and power circuits by using presently available circuit breaker constructions designed for lower voltages and thus it is possible to use associated panelboards and other equipment designed for use with these breakers. By providing an assembly of a plurality of series connected circuit breakers adapted for substantially simultaneously operation to interrupt a circuit, it is possible to interrupt efficiently a voltage substantially higher than if only one breaker were used. By providing a relatively inexpensive conductor connecting the circuit breakers in series and relatively inexpensive coupling means for the operating mechanism, it is possible to accommodate higher voltages in electrical light and power circuits by a simple and inexpensive modfiication of existing and conventional single-pole circuit breakers.

While I have disclosed only certain embodiments of the invention, it will be readily appreciated that many modifications thereof may be made. I therefore intend by the appended claims to cover all such modifications as fall within the true spirit and scope of the invention.

What I claim as new and desire to secure by Letters Patent of the United States is:

1. A circuit breaker assembly including:
   (a) a pair of electrical circuit breakers secured together in side-by-side relationship with a space between adjacent side walls thereof, each having (1) a casing of insulating material, (2) stationary and movable contacts therein, and (3) an operating mechanism within the casing for positioning said movable contact relative to said stationary contact in open and closed circuit positions, said mechanism comprising a releasable member normally biased to contact opening position, latch means normally restraining said releasable member and operable to release said releasable member for positioning said movable contact in the open circuit position, and a manual operating member extending outwardly of the casing for positioning said movable contact in the open and closed circuit positions;

(b) a conductor connecting the contacts of said pair of circuit breakers in series and having a first portion providing the stationary contact of one of said breakers, a second portion electrically connected to the movable contact of the other of said circuit breakers and an intermediate portion extending parallel to said side walls in said space between said side walls of said casings of said pair of circuit breakers;

(c) current responsive means in at least one of said pair of circuit breakers for releasing said releasable member upon the occurrence of predetermined current conditions;

(d) interconnecting means between the operating mechanisms of each of said circuit breakers actuated upon release of the releasable member of one of said breakers to cause substantially simultaneous release of the releasable member of the other of said breakers to position substantially simultaneously said movable contacts of both circuit breakers in the open circuit position;

(e) a coupling member on said manual operating members of the circuit breakers outwardly of said casings for operating the operating members substantially simultaneously to position said movable contacts of both circuit breakers in the open and closed position substantially simultaneously.

2. An electric circuit breaker assembly comprising:

(a) a generally rectangular enclosure of insulating material having a pair of opposed side walls and a pair of opposed end walls, barrier means extending between said end walls parallel to said side walls and forming a pair of electric circuit breaker pole chambers in said enclosure;

(b) each of said pole chambers containing a pair of relatively movable contacts movable into and out of engagement with each other between closed and open circuit positions respectively, operating mechanism for operating said contacts between said open and closed circuit positions, and means for releasably holding said contacts in said closed circuit position;

(c) means for actuating said operating mechanisms simultaneously from outside of said enclosure;

(d) first current responsive means in a first one of said pole chambers, second current responsive means in a second one of said pole chambers;

(e) means electrically connecting said pair of contacts in said first chamber in series with said pair of contacts in said second chamber;

(f) each of said first and second current responsive means being responsive to current flowing in the series circuit comprising said first and second pairs of contacts to cause release of said releasable holding means;

(g) said second current responsive means being responsive to current conditions substantially different from the current conditions to which said first current responsive means is responsive;

(h) said first current responsive means constituting the only current responsive means in said first one of said pole chambers, and said second current responsive means constituting the only current responsive means in said second one of said pole chambers.

3. An electric circuit breaker assembly comprising:

(a) an enclosing casing of insulating material having a pair of side-by-side chambers therein separated by a partition wall of insulating material;

(b) a pair of separable contacts in each of said chambers;

(c) electrical conducting means connecting said pairs of cooperable contacts in series;

(d) manually operable operating mechanism supported in at least one of said casings for moving said pairs of separable contacts between open and closed circuit positions in unison, said operating mechanism including a releasable member and means normally biasing said releasable member to opening position, latch means normally restraining said releasable member and operable to release said releasable member for moving said contacts to open condition;

(e) thermal current responsive means in one of said chambers, magnetic current responsive means in the other of said chambers, and means connecting each of said current responsive means to said operating mechanism for causing release of said releasable member upon the occurrence of predetermined current conditions through said contacts, said thermal current responsive means constituting the only current responsive means in said one chamber, and said magnetic current responsive means constituting the only current responsive means in said other of said chambers.

4. An electric circuit breaker assembly as set forth in claim 1 wherein said first current responsive means comprises time delay current responsive means and said second current responsive means comprises substantially instantaneous current responsive means.

5. A circuit breaker assembly comprising:

(a) a generally rectangular casing of insulating material having a pair of side walls and first and second end walls and barrier means extending between said end walls parallel to said side walls and forming first and second pole chambers;

(b) a stationary contact supported in each of said pole chambers of said casing adjacent said first end wall, a movable contact supported in each of said pole chambers for movement between open and closed circuit positions with respect to a corresponding one of said stationary contacts;

(c) a first externally accessible electric terminal means supported on said insulating casing adjacent said first end wall, means connecting said first terminal means to said stationary contact in said first one of said pole chambers;

(d) means connecting said movable contact of said first pole chamber to said stationary contact in said second pole chamber;

(e) second externally accessible terminal means supported on said casing adjacent said second end wall, means connecting said movable contact of said second pole chamber to said second externally accessible terminal;

(f) manually operable operating mechanism supported in said casing and including means for moving both of said movable contacts between said open and closed circuit positions, said operating mechanism including a releasable member and latch means normally restraining said releasable member, said releasable member being movable when released to cause automatic movement of said movable contacts from said closed to said open circuit position;

(g) current responsive means responsive to current flowing through said contacts, means connecting said current responsive means to said operating mechanism for releasing said releasable member upon the occurrence of predetermined current conditions, said current responsive means being contained entirely in said first one of said pole chambers, there being no current responsive means in the other of said pole chambers, and means for causing automatic opening of the contacts of both of said pole chambers upon release of said releasable means.

6. An electric circuit breaker as set forth in claim 1 wherein said first current responsive means is the only current responsive means in said first pole chamber, and said second current responsive means is the only current responsive means in said second pole chamber.

7. An electric circuit breaker as set forth in claim 1 wherein said conductive means connecting said movable contact of said first pole chamber to said stationary contact of said second pole chamber includes an elongated conductor supported by said insulating casing between adjacent side walls of said individual housings and extending substantially parallel to said side walls.

References Cited

UNITED STATES PATENTS

| 2,779,831 | 1/1957 | Thomas. |
| 2,822,446 | 2/1958 | Stanback et al. |
| 2,968,709 | 1/1961 | Ingwersen _____ 200—116.2 |
| 3,054,025 | 9/1962 | Edmunds _____ 317—119 |
| 3,152,287 | 10/1964 | Edmunds _____ 317—58 |
| 3,290,474 | 12/1966 | Gelzheiser. |

BERNARD A. GILHEANY, *Primary Examiner.*

HAROLD BROOME, *Assistant Examiner.*

U.S. Cl. X.R.

335—160